(12) United States Patent
McRae

(10) Patent No.: US 8,941,312 B2
(45) Date of Patent: *Jan. 27, 2015

(54) APPARATUS AND METHOD FOR CONTROLLING LED LIGHT STRINGS

(71) Applicant: Michael M. McRae, Ormond Beach, FL (US)

(72) Inventor: Michael M. McRae, Ormond Beach, FL (US)

(73) Assignee: NCP Corporation, Cranford, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,755

(22) Filed: Dec. 31, 2012

(65) Prior Publication Data

US 2014/0111101 A1    Apr. 24, 2014

Related U.S. Application Data

(63) Continuation-in-part of application No. 12/930,892, filed on Jan. 19, 2011, now Pat. No. 8,450,950.

(60) Provisional application No. 61/631,205, filed on Dec. 29, 2011, provisional application No. 61/296,258, filed on Jan. 19, 2010, provisional application No. 61/460,048, filed on Dec. 23, 2010.

(51) Int. Cl.
*H05B 37/00* (2006.01)
*H05B 33/08* (2006.01)

(52) U.S. Cl.
CPC ........ *H05B 33/0857* (2013.01); *H05B 33/0806* (2013.01)
USPC ............ 315/193; 315/291; 315/362; 315/307

(58) Field of Classification Search
CPC ..... F21V 23/04; F21S 41/001; B23K 11/248; H05B 33/0815
USPC ............. 315/193, 307, 186, 291, 362; 307/25
See application file for complete search history.

(56) References Cited

U.S. PATENT DOCUMENTS

| | | | |
|---|---|---|---|
| 5,734,116 A * | 3/1998 | Schaeffer | 73/865.6 |
| 6,211,626 B1 * | 4/2001 | Lys et al. | 315/291 |
| 6,285,140 B1 * | 9/2001 | Ruxton | 315/312 |
| 6,461,019 B1 | 10/2002 | Allen | |
| 6,714,140 B2 * | 3/2004 | Eguiluz Fernandez | 340/908.1 |
| 8,198,831 B2 * | 6/2012 | Matsuoka et al. | 315/307 |
| 8,450,950 B2 * | 5/2013 | McRae | 315/318 |
| 8,517,562 B2 * | 8/2013 | Harbers et al. | 362/223 |
| 2002/0181250 A1 * | 12/2002 | Riggio et al. | 363/16 |
| 2009/0189533 A1 * | 7/2009 | Hsu | 315/185 S |
| 2010/0134049 A1 * | 6/2010 | Matsuoka et al. | 315/307 |

(Continued)

FOREIGN PATENT DOCUMENTS

CN    201846507 U    *  5/2011

*Primary Examiner* — Thuy Vinh Tran
*Assistant Examiner* — Syed M Kaiser
(74) *Attorney, Agent, or Firm* — James M. Smedley LLC

(57) ABSTRACT

An enhanced control mechanism for an LED light string system is provided for switching between one of two DC output phases or polarities so as to actuate one or the other of two LEDs within the bulbs on the light string. The control mechanism is further configured to allow switching so as to pass through the input power provided by a high-to-low voltage converter that is plugged into its electrical power feeding end. The control mechanism may then provide rectified AC voltage, or DC voltage, of various switched values to the LED string according to the particular needs of the LED bulbs.

20 Claims, 8 Drawing Sheets

(56) References Cited

U.S. PATENT DOCUMENTS

| | | | |
|---|---|---|---|
| 2011/0241551 A1* | 10/2011 | McRae | 315/130 |
| 2012/0074861 A1* | 3/2012 | Lowenthal et al. | 315/244 |
| 2013/0049484 A1* | 2/2013 | Weissentern et al. | 307/104 |
| 2013/0119882 A1* | 5/2013 | Mao et al. | 315/210 |
| 2013/0314004 A1* | 11/2013 | Harbers et al. | 315/362 |

* cited by examiner

APPARATUS AND METHOD FOR CONTROLLING LED LIGHT STRINGS

RELATED APPLICATIONS

This application is a continuation-in-part of U.S. Patent Application Ser. No. 12/930,892, entitled "Apparatus and Method for Controlling LED Light Strings" filed Jan. 19, 2011, which in turn, claims priority to the U.S. Provisional Patent Application Ser. No. 61/296,258, titled "Adapter for Coordinating Illumination of Multi-Color LED Lighting String Displays", filed on Jan. 19, 2010; the U.S. Provisional Patent Application Ser. No. 61/460,048, titled "Apparatus and Method for LED Light String Connection", filed on Dec. 23, 2010, the contents of all of which are herein incorporated by reference in their entirety.

This application further claims priority to the U.S. Provisional Patent Application Ser. No. 61/631,205, titled "Method and Apparatus for Controlling an LED Light String", filed on Dec. 29, 2011 the contents of which are incorporated herein by reference in its entirety.

FIELD OF THE INVENTION

The disclosure relates generally to a multi-color light emitting diode (LED) light string, and more specifically, to a separate high voltage to low voltage converter for providing a low voltage power source for a controller that coordinates the illumination of the different color LED lights; the lights being contained within a single light string or among several interconnected LED light strings.

BACKGROUND OF THE INVENTION

Various LED light strings have been proposed for decorative illumination purposes. U.S. Pat. Appln. Pub. No. US2009/0189533 (Hsu), for example, discloses an LED-based light string formed with multiple, dual colored LED lamps and a controller for coupling the LED light string to the power supply. According to one preferred embodiment in Hsu, FIG. 4 discloses a light string in which two LED lamps of different colors are set within a single body. The body is shown to have two connection leads, and the two LED lamps are electrically connected within the body such that one LED lamp illuminates when a positive DC voltage is applied to the two leads of the body and the other LED lamp illuminates when a negative DC voltage is applied to the two leads of the body. Multiple bodies are then electrically connected in series so as to create a single string of LED lights. Claim 3 of Hsu further states that the controller can control only one or the other of the two LEDs within the body to emit a single color, or can control both alternately to emit both colors. However, Hsu does not disclose any structure or mechanisms for accomplishing these control functions.

Other arrangements of the LEDs within light strings are also known. U.S. Pat. No. 6,461,019 (Allen) discloses a LED light string in which a plurality of LEDs are wired in block series-parallel where one or more series blocks are each driven at the same input voltage as the source voltage and the series blocks are coupled in parallel. Allen also mentions that the individual LEDs of the light string may be arranged continuously (using the same color) periodically (using multiple, alternating CIP colors), or pseudo-randomly (any order of multiple colors). However, Allen does not provide for any control functions regarding the illumination of different colored LED within those arrangements.

Thus the need exists to provide for a LED light string controller that is capable of controlling and coordinating the specific illumination of the LEDs within the string, particularly with respect to the control of color. Further, one master LED light controller would ideally provide such control functions in an arrangement containing multiple LED light strings, while the controllers for the other light strings followed or mirrored the color selection made by master controller.

SUMMARY OF THE INVENTION

In one aspect of the invention, a lighting system is provided including a voltage conversion module for converting a high voltage AC electric power source to a low voltage AC electric power source and the controller is electrically coupled to the low voltage AC power source at a first connection and electrically coupled to a plurality of light strings at a second connection, the second connection being polarized, the plurality of light strings having a polarized connector at one end for connection to the second connection of the controller, the light strings having a plurality of bulbs containing a first color LED and a second color LED, the LEDs within the bulbs electrically coupled so that a first voltage phase applied to the light string provides a turn-on bias to the first color LEDs within the bulbs and a second voltage phase applied to the light string provides a turn-on bias to the second color LEDs within the bulbs, the controller having a rectifier for accepting the input low voltage AC electrical power source and providing an output DC electrical power, the controller having a switch with a plurality of switch positions including: a first switch position for providing the output DC electrical power at the second connection to the light string in the first voltage phase according to a first rectification provided by the rectifier within the controller; a second switch position for providing the output DC electrical power at the second connection to the light string in the second voltage phase according to a second rectification provided by the rectifier within the controller, and a third switch position for providing the electrical power source input to the connector directly as the output DC electrical power at the second connection and to the light string.

In variations of this arrangement, the lighting system includes at least one additional controller having first and second polarized connections, a first connection of the additional controller connected to the second polarized connection of the controller and a second polarized connection of the another controller connected to the polarized connection of at least one of the light strings. Alternatively, the lighting system includes a plurality of the light strings and a plurality of the additional controllers, the controller having the switch in either of the first or the second switch positions; each of the additional controllers having the switch in the third switch position; or either the controller or one of the additional controllers includes a fourth switch position that provides no output DC electrical power to the second connection of the one controller; or the rectifier is one of a full-wave bridge, half-wave bridge, or a rectifier contained with an integrated circuit; or the voltage conversion module has one of a power converter, a power inverter, a power adapter, or a transformer; or the polarized connector is a NEMA-standard plug; or the controller of claim 1 wherein the controller includes a second switch for providing variable effects wherein the variable effects include flashing, fading, sequential following, and strobing.

In another aspect of the invention, a method of providing switched control to a lighting system is presented including the steps of coupling a first connection of a voltage conversion module to a high voltage AC electric power source, the voltage conversion module converting the high voltage AC electric power to a low voltage AC electric power source and providing the low voltage AC electric power to a second connection of the voltage conversion module; coupling the second connection of the voltage conversion module to a first connection of a controller, the controller rectifying the low voltage AC electric power to a low voltage DC power source, the controller providing a switching function among a first voltage phase, a second voltage phase and a pass-through; and coupling the second connection of the controller to an LED light string so as to provide the low voltage DC power source to the LED light string.

The method may further include steps directed at coupling a first connection of a second controller to the second connection of the first controller for providing the low voltage electric power to the second controller; coupling the second connection of the second controller to a second LED light string so as to provide the low voltage DC power source to the second LED light string; switching the first controller to one of the first voltage phase or the second voltage phase so as to provide DC rectified power to the LED light string and the second controller; and switching the second controller to the pass-through so as to provide low voltage, DC rectified power to the second LED light string; or coupling the second connection of the first controller to a second LED light string so as to provide the low voltage DC power source to the second LED light string.

BRIEF DESCRIPTION OF THE DRAWINGS

The accompanying drawings, which are incorporated in and constitute part of this specification, illustrate embodiments of the invention and together with the description, serve to explain the principles of the invention. Like references indicate similar elements among the figures and such elements are illustrated for simplicity and clarity and have not necessarily been drawn to scale. The embodiments illustrated herein are presently preferred, it being understood, however, that the invention is not limited to the precise arrangements and instrumentalities shown, wherein.

DETAILED DESCRIPTION OF THE INVENTION

It is often desirable to have multiple LED light strings connected together for use as a lighting display or as part of such a display, such as on a Christmas tree or holiday decoration. In many displays it is also desirable for a lighting string to display a first color (e.g. clear or white) and then discontinue that displayed color in favor of a second color (e.g. blue or a plurality of other colors). In the case of color coordination and switching, it is also desirable to effect such changes easily and in a relatively simple manner. Specifically, the use of a single control point is desirable in larger lighted displays where multiple LED light strings are connected together and color change is to be effected among all such interconnected strings.

Figure 1:
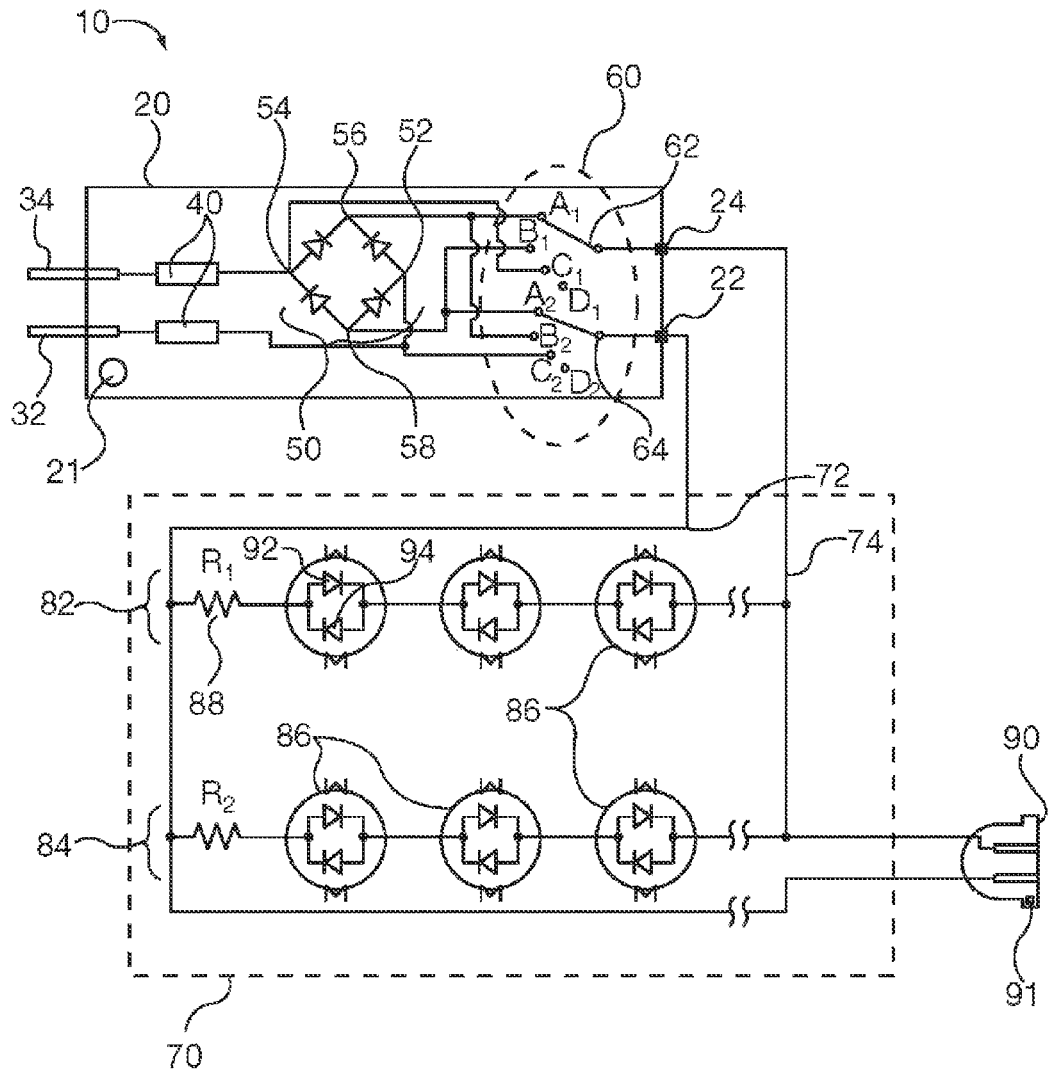
FIG. 1 is a circuit diagram of an LED light string system according to one embodiment of the present invention.

With reference to FIG. 1, a LED light string system 10 is provided containing a controller 20 and a plurality of LED light strings 70. The light string(s) 70 may be organized in any feasible arrangement given the power supply capabilities of the controller 20. As shown in FIG. 1, two blocks of series connected LEDs, 82 and 84, are wired in parallel between electrical connectors 72 and 74. As shown, each block of series connected LEDs contains a plurality of bulbs 86 each containing two LEDs 92 and 94 of two different colors. By way of the example shown in FIG. 1, the "W" and "M" designations next to the LEDs in the bulbs refer to "white" (clear) and "multi-colored" (e.g. blue) respectively. Resistor 88 is optionally included in each series block to provide a current limiting function within the series. Within each bulb, LEDs 92 and 94 are electrically connected to one another anode-to-cathode and cathode-to-anode such that a DC bias voltage applied across connectors 72 and 74 will turn on only one of the LEDs within each bulb. Further, the light string series are arranged such that a DC bias voltage applied across connectors 72 and 74 will turn on simultaneously all the similarly colored LEDs within each light string (i.e. either all white LEDs in the each light string or all colored LEDs in each light string). Connectors 72 and 74 are terminated at female plug end 90.

Controller 20 is electrically coupled to connectors 72 and 74 at connection points 22 and 24 respectively. Controller 20 has male plug leads 32 and 34 for plugging into a standard 115V AC receptacle or into the female plug end of another LED light string system. Fuses 40 are provided in series with associated electrical connectors coupled to male plug leads 32 and 34 which are then connected to a rectifier 50 at rectifier terminals 52 and 54 respectively. Four-position switch 60 is connected at one side to rectifier terminals 52, 54, 56 and 58 as shown and as further described below. Four-position switch 60 is connected at the other side to connectors 72 and 74 at connection points 22 and 24 respectively.

As shown, and strictly by way of example, rectifier 50 is a full-wave bridge rectifier having rectifier terminals 52, 54, 56 and 58. Although the operation of full-wave bridge rectifiers is well known to those of skill in the art, a brief description follows. In practice, almost any rectifier (e.g. full-wave, half-wave) or other AC/DC converter can be used operate in circuit position 50 so as to provide a single phase DC voltage at rectifier connection points 56 and 58. The term rectifier is used herein to denote any such device, without limitation, that provides such a function. In operation, an input AC voltage is applied across full-wave bridge rectifier terminals 52 and 54. During one half of the AC power cycle the two diodes on the left-hand side of the bridge are forward biased and the two diodes on the right-hand side of the bridge are reverse biased thereby making a half wave rectification (having a DC component in one phase) available at rectifier terminals 56 and 58. During the other half of AC power cycle the two diodes on the right-hand side of the bridge are forward biased and the two diodes on the left-hand side of the bridge are reverse biased thereby making another half wave rectification (having a DC power component in the same one phase) also available at rectifier terminals 56 and 58. It should be noted that if the output connection to rectifier terminals 56 and 58 is reversed, full wave rectification (the sum of the two half wave rectifications described above) would be provided in the second (other) phase such that the DC power component has an opposite polarity of that of the first phase.

Four-position switch 60 may be any type of electrical switch capable of making four different connections on the input (switched) side and providing the switched output at connection points 22 and 24. For example, rotary switches, four-position slide switches multiple-push, cycling button switches may all be used for such purposes. As indicated in FIG. 1, the four-position switch has two inputs as provided at terminals 62 and 64 from one of four labeled switch positions A, B, C, D. In switch position A (both switch levers—as shown by dashed lines), rectifier terminals 56 and 58 are connected to the switch output and connection points 24 and 22 respectively. In switch position B (both switch levers), the rectifier terminals are reversed and rectifier terminals 56 and 58 are connected to the switch output and connection points 22 and 24 respectively. In switch position C (both switch levers), the rectifier terminals are bypassed entirely and the switch output and connection points 22 and 24 are connected directly to the power input provided to male plug leads 32 and 34 respectively. In switch position D (both switch levers), no connection to a power input is provided and connection points 22 and 24 remain unpowered and electrically disconnected.

In operation, AC electrical power is provided at male plug leads 32 and 34. With the switch positioned at A, full wave rectification is provided at rectifier terminals 56 and 58 in a first phase (polarity) and passed on to connection points 22 and 24. The first phase DC voltage is conducted through the LED light string coupled across connectors 72 and 74 and all of the positively biased LEDs within each of the bulbs are illuminated. If the LEDs are arranged as described above, then a single (same) color LED will be illuminated in each of the bulbs in each of the series blocks (i.e. all W LEDs or all M LEDs will be illuminated). With the switch positioned at B, full wave rectification is provided at rectifier terminals 56 and 58 in a second phase (opposite polarity of the first phase) and passed on to connection points 22 and 24. The second phase DC voltage is conducted through the LED light string across connectors 72 and 74 and all of the positively biased LEDs within each of the bulbs are illuminated. If the LEDs are arranged as described above, then a single (same) color LED will be illuminated in each of the bulbs in each of the series blocks, but the LEDs other than those illuminated with the first phase DC voltage applied (i.e. if the W LEDs were illuminated by the first phase DC voltage then the M LEDs will be illuminated by the second phase DC voltage and vice-versa). With the switch positioned at C, no rectification is provided and the input AC (or DC) power provided at male plug leads 32 and 34 is passed directly on to connection points 22 and 24. If the input power is AC then both sets of LEDs (W and M) will light alternately as biased by the appropriate phase of the AC power cycle. In essence, the AC input power simultaneously provides two different DC power components, having two different phases, to the LEDs so that both LEDs appear to illuminate simultaneously. In practical application, the "flicker" that is taking place electrically through the alternation of the phases is likely to be imperceptible to the human eye and the light string will have the appearance of having all the LEDs, W and M, on simultaneously. On the other hand, if the input power is DC with the switch in position C, then only one set of LEDs (W or M) will illuminate depending on the phase of the DC input as described above with respect to switch position A and B. Finally, with the switch positioned at D, no input power is provided to connection points 22 and 24 and all the LEDs remain off.

Switch position C can be termed the "follower" position particularly when the DC input to the LED light string system is provided by another (predecessor) LED light string system coupled to plug leads 32 and 34. In this arrangement of series-connected LED light string systems, LEDs (W or M) of the second light string system will follow those illuminated in the first light string system resulting in a uniform illumination color across all such "follower configured" LED light string systems. To aid with this coordination of color matching, polarity dots 21 and 91 are provided on controller 20 and female plug end 90 respectively. Thus, if the polarity dots of consecutively connected LED light string systems are matched at each plug interface and the switch setting of the second and all subsequent LED light string systems are at C, the same polarity will be maintained at the same terminals of each string and all the same color LEDs (W or M) will illuminate in unison throughout the entire plurality of light string systems according to the switch setting of the controller on the first LED light string system.

Those of skill in the art will appreciate that numerous convoluted lighting schemes may be achieved by switching controllers to different settings (i.e. not necessarily switching all follower LED light strings to a "following" position C) at different points in the series of connected LED light string systems.

Figure 2:
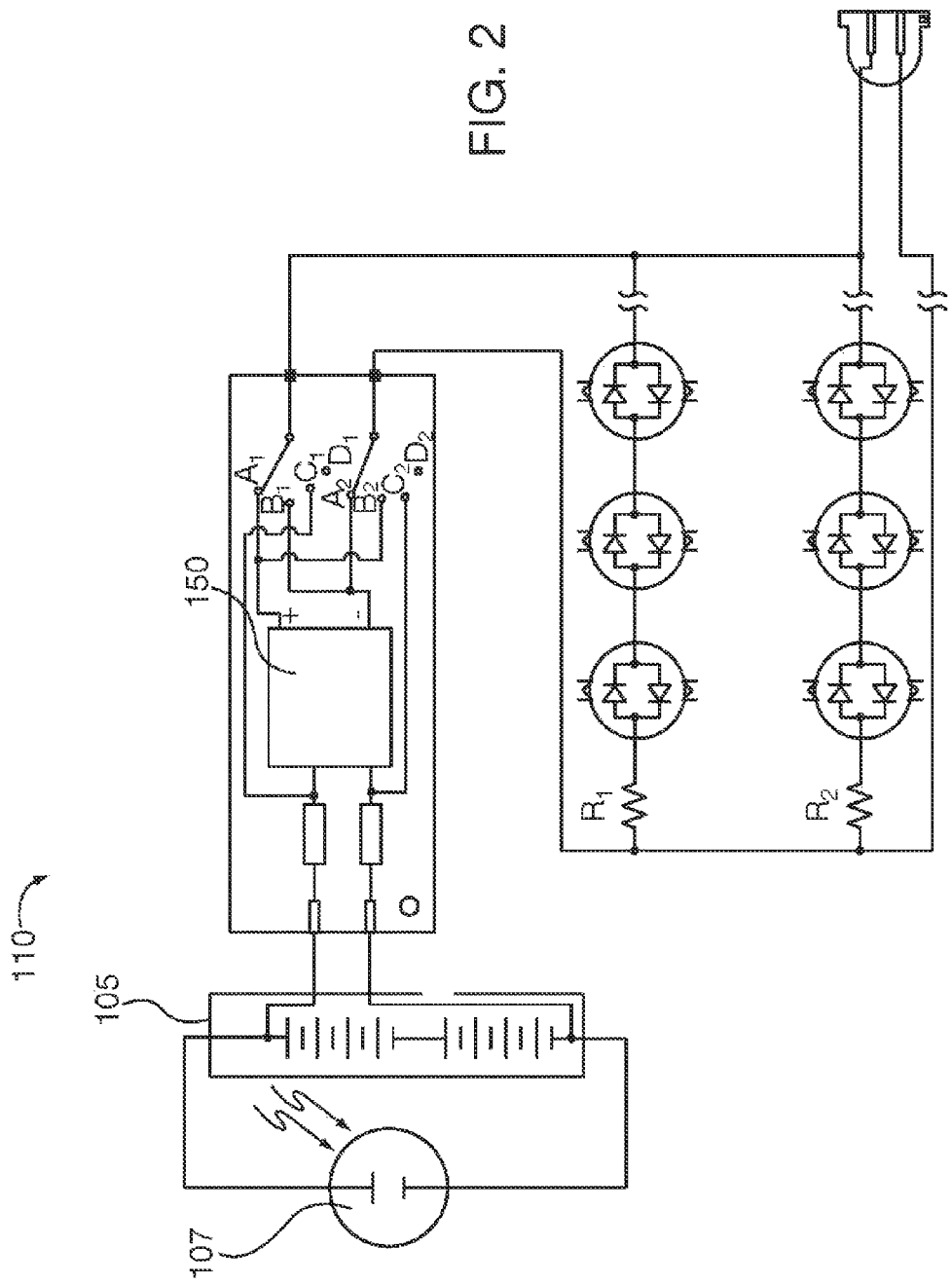
FIG. 2 is a circuit diagram of an LED light string system according to an alternative embodiment of the present invention.
Figure 3:
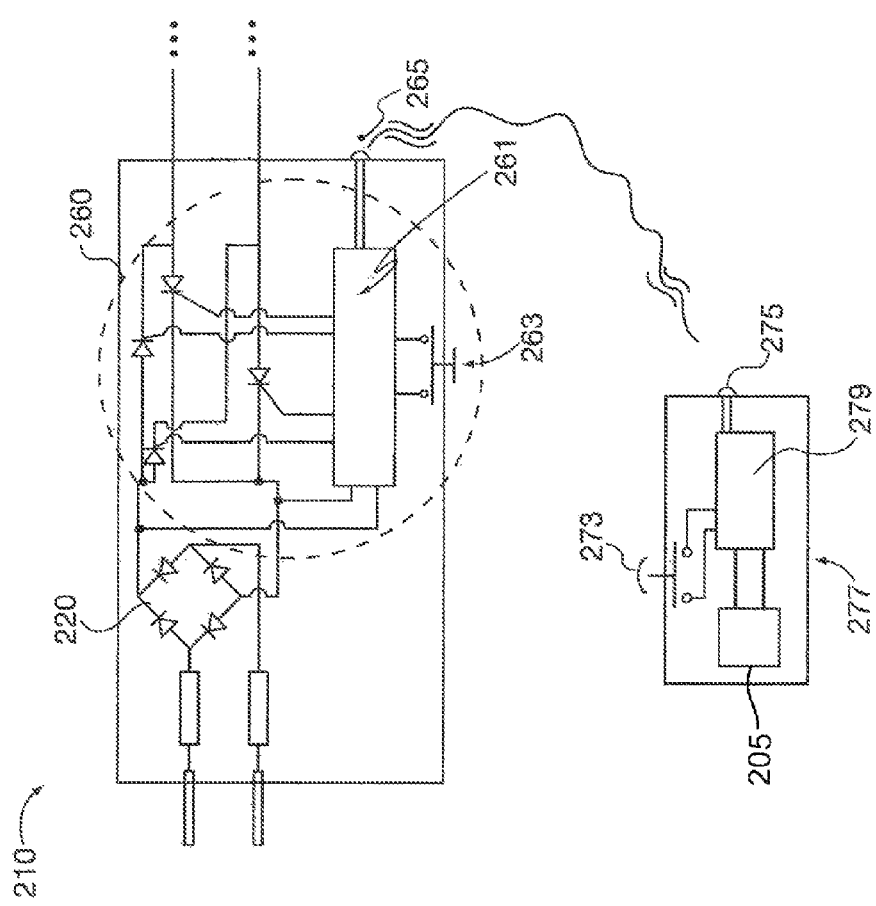
FIG. 3 is a diagram of a portion of an LED light string system according to an additional alternative embodiment of the present invention.
Figure 4:
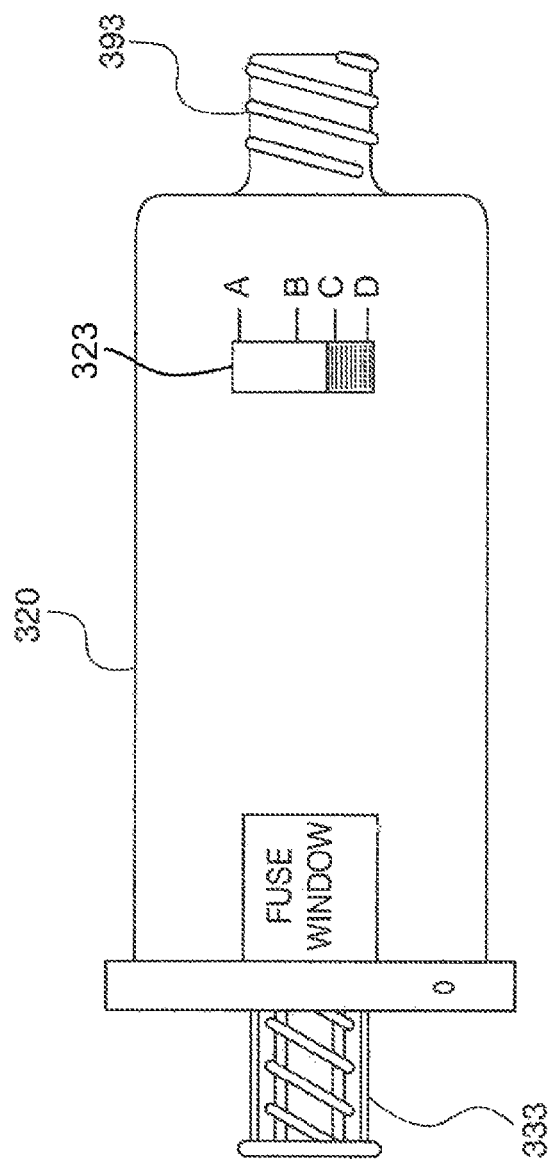
FIG. 4 is a side view of a separable controller for use with an LED light string system according to one embodiment of the present invention.

Although the physical construction and electrical circuit layout of FIG. 1 have been specifically disclosed, those of skill in the art will appreciate that alternative physical constructions and electrical arrangements may exist to accomplish the above-described functions without departing from the teaching of the present invention. Referring to FIG. 2, a low voltage AC/DC converter 150 may be substituted for the full-wave bridge rectifier 50. In one particularly preferred embodiment, a 12 or 24 volt DC output is provided by the low voltage AC/DC converter. Further, battery 105 may provide the input DC power for LED light string system 110 and the battery may be charged by optional solar cell 107. Referring to FIG. 3, four-position switch of controller 220 may be replaced with an integrated circuit 261 and associated circuitry (all within integrated circuit switch complex 260) wherein the integrated circuit is cycled through the four inputs with a push-button switch 263. Alternatively or in addition, remote control capability may be added for switching the controller. Wireless receiver/transmitter head 265 may be included in controller 220 for coordinating wireless communication with remote 277 having its own wireless receiver/transmitter head 275. Push-button switch 273 on the remote is used to switch among the controller switch positions in this embodiment and wireless signals exchanged between the receiver/transmitter heads 265 and 275 include switch position information and convey switch transition information for interpretation and execution by integrated circuit switch complex 260 and the wireless remote processor 279. Finally, the controller 20 may be removed from male plug leads 32 and 34 (which may be part of a typical AC male plug) and located at different positions within the LED light string cord. Alternatively, and referring to FIG. 4 the controller 320 may be an entirely separate component of the LED light string system for configurable connection to any one of a number of power inputs and LED light strings to be controlled. In one particularly preferred embodiment, the female plug end 90 is replaced by standardized connector 393 (shown as a screw-in connection in FIG. 4) that automatically maintains proper polarity alignment via a connector capable of only a single coupling orientation. A cap piece 333 may be provided so as to be mateably connected with the male plug ends to allow for chaining LED light string systems in series.

Figure 5:
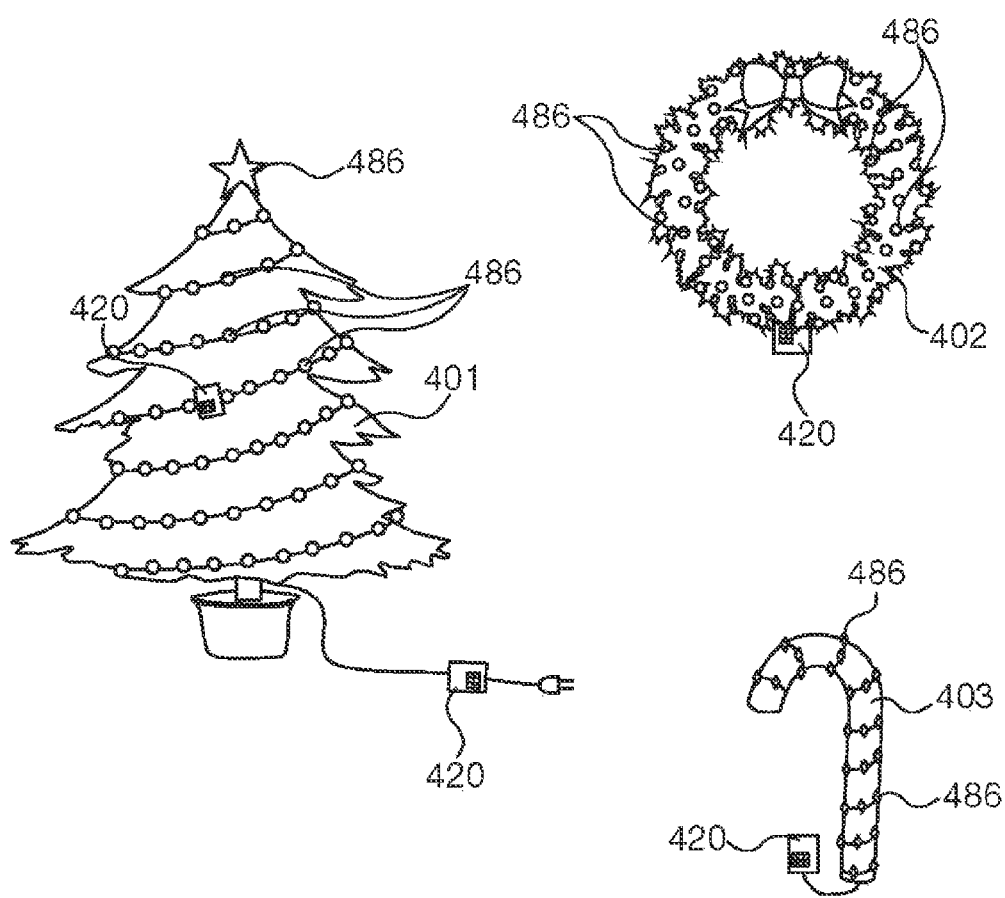
FIG. 5 provides a diagram illustrating a practical application of the LED light string system according to the teachings of the present invention.
Figure 6:
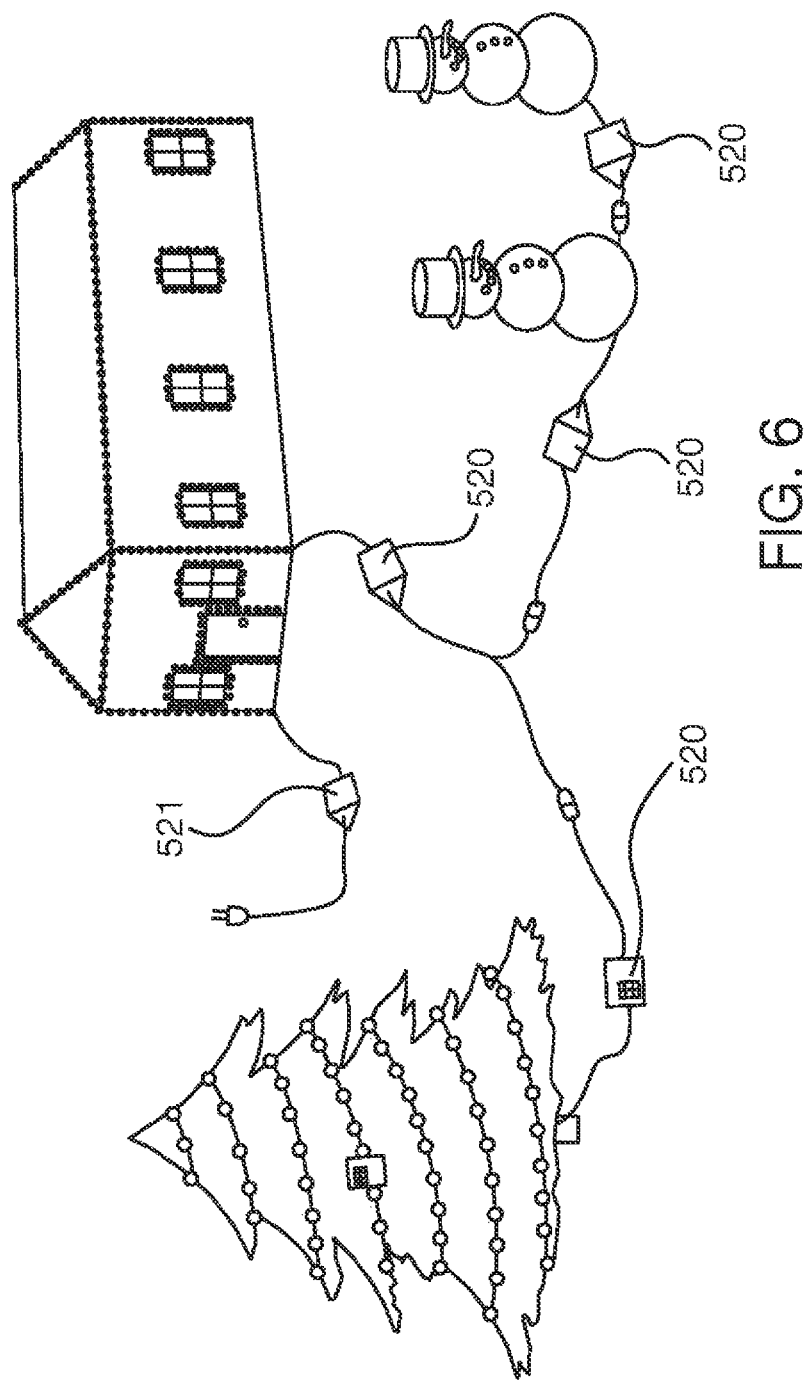
FIG. 6 provides another diagram illustrating a practical application of the LED light string system according to the teachings of the present invention.

In practical application, referring to FIG. 5, the LED light string systems of the present invention may be used on any type of holiday decorations, such as Christmas trees 401, wreaths 402, and other lighted holiday ornamentation 403. Each of these may require one or more LED light string systems to achieve the desired lighting effect. Dual color LED bulbs 486 controlled by controllers 420 may operate independent of each other as shown in FIG. 5, or they may be interconnected and properly switched at each controller to achieve a more coordinated effect as shown in FIG. 6. As shown there, a master controller 521 may be switched to setting A or B while all other controllers 520 may be switched to setting C to "follow" the polarity and presumably the color scheme selected by the master controller. All the "follower" LED light strings do not necessarily have to be of the same color or even a coordinated color depending on the desired lighting effect design, but interconnection of all the LED light strings ensures that "follower strings" have the capability of matching the LED color (through DC voltage phase pass through as selected by the master controller).

Figure 7:
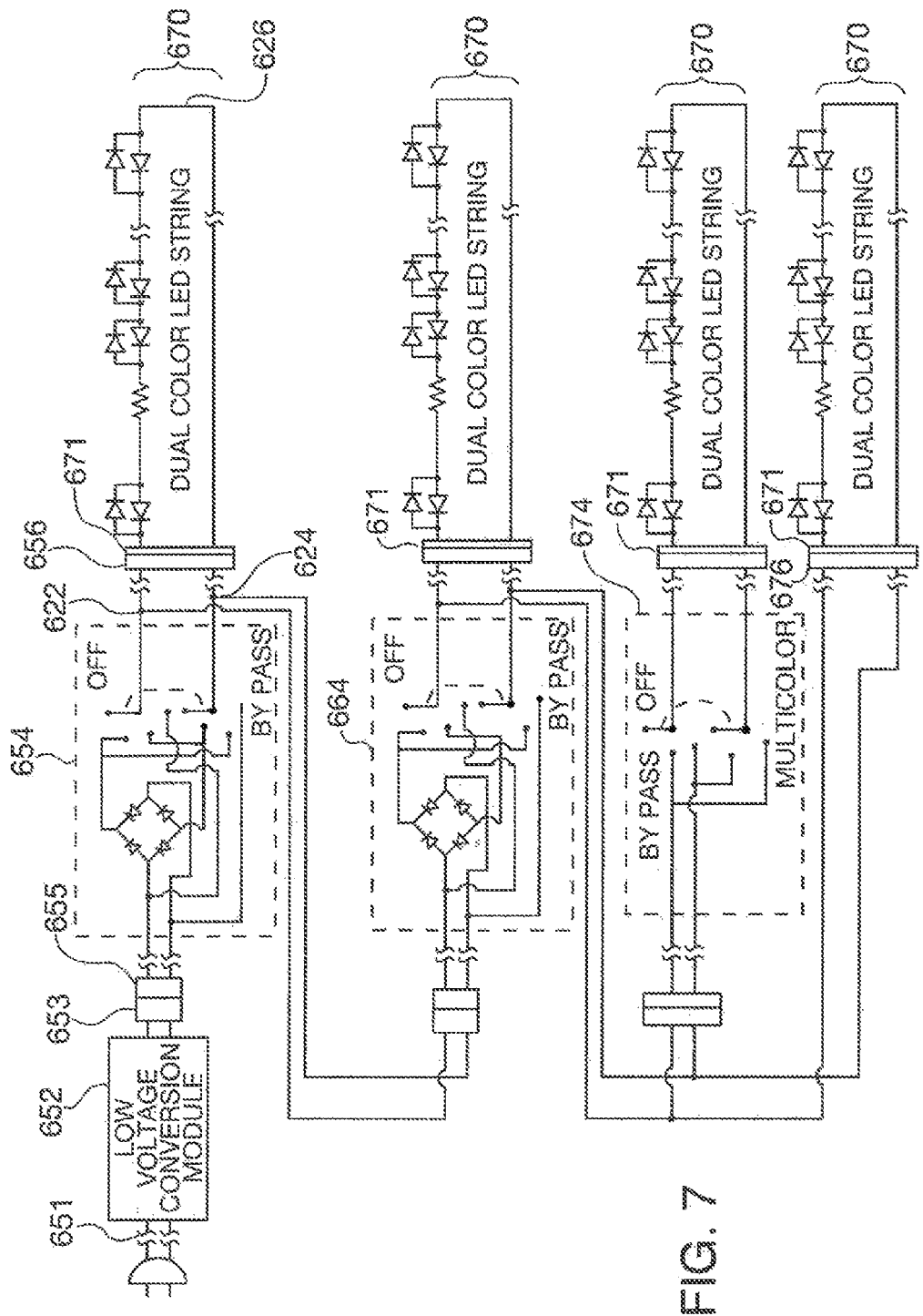
FIG. 7 provides a circuit diagram of an LED light string system according to another embodiment of the present invention.
Figure 8:
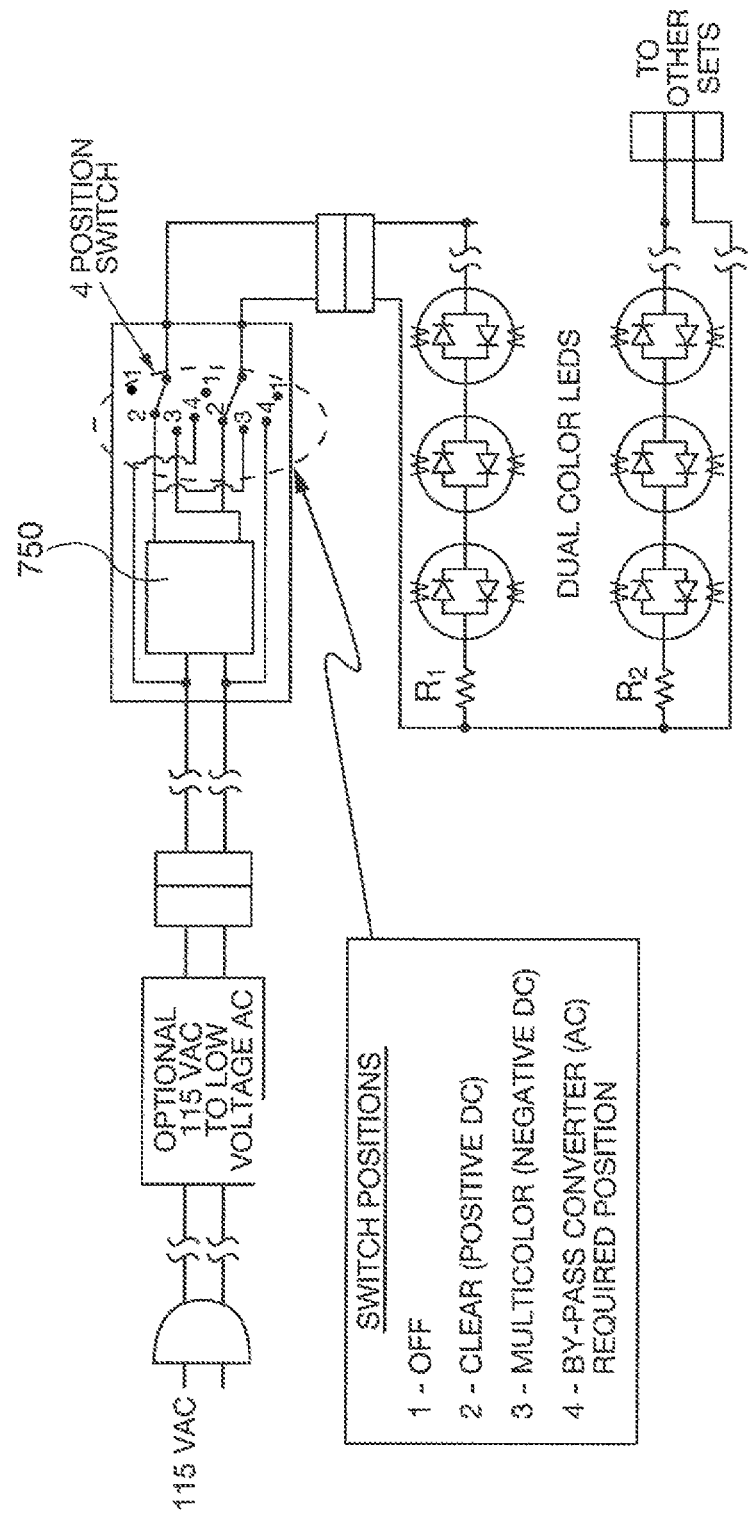
FIG. 8 provides a circuit diagram of an LED light string system according to another embodiment of the present invention.

In one commercially important regard, consumer safety concerns are critical to and omnipresent in the proper design of electronic consumer goods. As such, it is highly desirable to provide a low voltage lighting system in which most all connections within the lighting system are made at a low distributed voltage such that the lighting system significantly and substantially operates at that low voltage. FIGS. 7 and 8 illustrate one embodiment of the light string system of the present invention in which this objective is achieved.

As shown in FIG. 7, the high-to-low voltage conversion and rectification functions originally provided in block 150 in FIG. 2 have been separated into two separate and discrete functions: voltage conversion, as provided in voltage conversion module 652, and rectification and switching, as provided in module 654. Voltage conversion module is connected at a first connection 651 to a high voltage power source, such as a typical 115V AC power outlet. The voltage conversion module 652 is connected at a second connection 653 to rectification and switching module 654 at its first connection 655. Connections 653 and 655 may be either polarized, meaning that they have only one connection orientation, or unpolarized. High-to-low voltage conversion module may be composed of any known or heretofore developed commercial voltage converters such as those provided by power converters, power inverters, power adapters, or transformers.

The remaining portions of the light system, beyond the high-to-low voltage conversion module, consists of a plurality of light strings 670, each of which have a polarized connector (or plug) 671 at one end. These light strings may be coupled to rectification and switching module 654 in any of a number of configurations. In one arrangement, shown at the top of FIG. 7, rectification and switching module 654 is disposed between the high-to-low voltage conversion module 652 and the light string 670. At a first connection 655, the rectification and switching module is connected to second connection 653 of high-to-low voltage conversion module 652, and at a second, polarized connection, 656, rectification and switching module 654 is connected to the polarized connection 671 of the light string. In another arrangement, rectification and switching module 664 is connected in series with previous rectification and switching module 654 at the same polarized connection, 656 (or other similarly constructed connection point at that point in the circuit). In yet another arrangement, light strings 670 may be directly connected in series with first rectification and switching module 654, or other similarly constructed connection point at that point in the circuit.

It should be recognized that connection points 622 and 624 may be at any of a number of a plurality of points along the first dual color light string 670, including but not limited to the other end of the light string 626 from its connection to the rectification and switching module 654. In this regard, the light strings can be coupled in series, through a plurality of intervening rectification and switching modules, or in parallel, one each through its own rectification and switching module, e.g. 664, or entirely without any subsequent coupling to additional rectification and switching modules, e.g. 676.

With respect to the rectification and switching modules 654, 664, 674, and as mentioned above, any type of rectifier and switch combination may be contained within those modules. For example, the rectification portion of the module may consist of a full-wave rectifier, a half-wave rectifier, or an integrated circuit that provides the same function, as shown at 750 FIG. 8. With respect to the switching portion of the module, any of several types of mechanical switches may be employed such as a rotary switch, sliding switch, or a sequenced step switch with the actual switching function provided by mechanical connections to the switch activation mechanism or a switching circuit contained within an integrated circuit activated by any of the above-mentioned mechanical activation mechanisms. Further, switches with a different number of poles may be employed at different points in the overall system to achieve different effects. For example, four-position switches (e.g. first voltage phase, second voltage phase, pass-through/bypass, and off) may be coupled to some light strings, e.g. 654 and 664, while three-position switches (e.g. first voltage phase, second voltage phase, and either pass-through/bypass or off) may be coupled to other light strings, e.g. 674.

In yet another aspect of the invention, the controller includes a second switch (not shown) according to which variable effects may be triggered to occur in the light string. Such variable effects may include flashing of the lights, fading of the lights, sequential following of the lights, and strobing of the lights.

In one particularly advantageous aspect of the invention, low-powered voltage signals are presented to the entire lighting system at the system head end, after which the first rectification and switching module can be set to one or another particular phase, or turned off entirely. Given this arrangement, all other rectification and switching modules may be set to a pass-through/bypass mode such that the same low voltage, uniphase signal generated by the first rectification and switching module is reliably presented to each of the other light strings by virtue of the polarized connections therebetween and the pass-through settings of any intervening rectification and switching modules.

While the invention has been shown and described with reference to specific preferred embodiments, it should be understood by those skilled in the art that various changes in form and detail may be made therein without departing from the spirit and scope of the invention as defined by the following claims.

What is claimed is:
1. A lighting system comprising:
   a voltage conversion module for converting a high voltage AC electric power source to a low voltage AC electric power source;
   a controller electrically coupled to said low voltage AC power source at a first connection and electrically coupled to a plurality of light strings at a second con- nection, said second connection being polarized, said plurality of light strings having a polarized connector at one end for connection to said second connection of said controller, said light strings having a plurality of bulbs containing a first color LED and a second color LED, said LEDs within said bulbs electrically coupled so that a first voltage phase applied to said light string provides a turn-on bias to said first color LEDs within said bulbs and a second voltage phase applied to said light string provides a turn-on bias to said second color LEDs within said bulbs, said controller having a rectifier for accepting said input low voltage AC electrical power source and providing an output DC electrical power, said controller having a switch with a plurality of switch positions including:

a first switch position for providing said output DC electrical power at said second connection to said light string in said first voltage phase according to a first rectification provided by said rectifier within said controller;

a second switch position for providing said output DC electrical power at said second connection to said light string in said second voltage phase according to a second rectification provided by said rectifier within said controller, and a third switch position for providing said electrical power source input to said connector directly as said output DC electrical power at said second connection and to said light string.

2. The lighting system of claim 1 including at least one additional controller having first and second polarized connections, a first connection of said additional controller connected to said second polarized connection of said controller and a second polarized connection of said another controller connected to said polarized connection of at least one of said light strings.

3. The lighting system of claim 2 wherein said lighting system includes a plurality of said light strings and a plurality of said additional controllers, said controller having said switch in either of said first or said second switch positions; each of said additional controllers having said switch in said third switch position.

4. The lighting system of claim 2 wherein either said controller or one of said additional controllers includes a fourth switch position that provides no output DC electrical power to said second connection of said one controller.

5. The lighting system of claim 1 wherein said rectifier is one of a full-wave bridge, half-wave bridge, or a rectifier contained with an integrated circuit.

6. The lighting system of claim 1 wherein said voltage conversion module has one of a power converter, a power inverter, a power adapter, or a transformer.

7. The controller of claim 1 wherein said polarized connector is a NEMA-standard plug.

8. The controller of claim 1 wherein said controller includes a second switch for providing variable effects.

9. The controller of claim 8 wherein said variable effects include one of flashing, fading, sequential following, and strobing.

10. A method of providing switched control to a lighting system comprising:
coupling a first connection of a voltage conversion module to a high voltage AC electric power source, said voltage conversion module converting said high voltage AC electric power to a low voltage AC electric power source and providing said low voltage AC electric power to a second connection of voltage conversion module;
coupling said second connection of said voltage conversion module to a first connection of a controller, said controller rectifying said low voltage AC electric power to a low voltage DC power source, said controller providing a switching function among a first voltage phase, a second voltage phase and a pass-through; and
coupling said second connection of said controller to an LED light string so as to provide said low voltage DC power source to said LED light string.

11. The method of claim 10 further comprising:
coupling a first connection of a second controller to said second connection of said first controller for providing said low voltage electric power to said second controller;
coupling said second connection of said second controller to a second LED light string so as to provide said low voltage DC power source to said second LED light string;
switching said first controller to one of said first voltage phase or said second voltage phase so as to provide DC rectified power to said LED light string and said second controller; and
switching said second controller to said pass-through so as to provide low voltage, DC rectified power to said second LED light string.

12. The method of claim 10 further comprising coupling said second connection of said first controller to a second LED light string so as to provide said low voltage DC power source to said second LED light string.

13. A lighting system comprising:
a voltage conversion module for converting a high voltage AC electric power source to a low voltage AC electric power source;
a controller electrically coupled to said low voltage AC power source at a first connection and electrically coupled to a plurality of light strings at a second connection, said second connection being polarized, said plurality of light strings having a polarized connector at one end for connection to said second connection of said controller, said light strings having a plurality of bulbs containing a first color LED and a second color LED, said LEDs within said bulbs electrically coupled so that a first voltage phase applied to said light string provides a turn-on bias to said first color LEDs within said bulbs and a second voltage phase applied to said light string provides a turn-on bias to said second color LEDs within said bulbs, said controller having a rectifier for accepting said input low voltage AC electrical power source and providing an output DC electrical power, said controller having a switch with a plurality of switch positions including:
a first switch position for providing said output DC electrical power at said second connection to said light string in said first voltage phase according to a first rectification provided by said rectifier within said controller; and
a second switch position for providing said output DC electrical power at said second connection to said light string in said second voltage phase according to a second rectification provided by said rectifier within said controller.

14. The lighting system of claim 13 wherein said lighting system includes a plurality of said light strings and a plurality of said controllers, said controller having said switch in either of said first or said second switch positions; each of said additional controllers having said switch in said third switch position.

15. The lighting system of claim 14 wherein either said controller or one of said controllers includes a fourth switch position that provides no output DC electrical power to said second connection of said one controller.

16. The lighting system of claim 13 wherein said rectifier is one of a full-wave bridge, half-wave bridge, or a rectifier contained with an integrated circuit.

17. The lighting system of claim 13 wherein said voltage conversion module has one of a power converter, a power inverter, a power adapter, or a transformer.

18. The controller of claim 13 wherein said polarized connector is a NEMA-standard plug.

19. The controller of claim 13 wherein said controller includes a second switch for providing variable effects.

20. The controller of claim 19 wherein said variable effects include one of flashing, fading, sequential following, and strobing.

* * * * *